United States Patent

[11] 3,602,801

| [72] | Inventor | James A. Williamson<br>Santa Ana, Calif. |
|---|---|---|
| [21] | Appl. No. | 32,236 |
| [22] | Filed | Apr. 27, 1970 |
| [45] | Patented | Aug. 31, 1971 |
| [73] | Assignee | The United States of America as represented by the Secretary of the Navy |

[54] SWITCHING VOLTAGE AND CURRENT REGULATOR CONTROLLER
7 Claims, 3 Drawing Figs.

[52] U.S. Cl. ........................................ 323/17,
    307/234, 307/297, 323/22 T, 323/44, 323/66
[51] Int. Cl. ........................................ G05f 1/20
[50] Field of Search ........................................ 323/4, 6, 9,
    17, 22 T, 31, 38, 44, 66; 307/234, 282, 296, 297

[56] References Cited
UNITED STATES PATENTS

| 3,229,194 | 1/1966 | Mills ............................ | 323/22 T |
| 3,323,037 | 5/1967 | Doss ............................ | 323/22 T |
| 3,461,377 | 8/1969 | Reese ........................... | 323/22 T |
| 3,514,692 | 5/1970 | Lingle .......................... | 307/297 X |

Primary Examiner—Gerald Goldberg
Attorneys—R. S. Sciascia and H. H. Losche

ABSTRACT: A switching voltage and current regulator controller having an isolation transformer coupling a supply voltage to a load with an isolation amplifier in a feedback loop to deliver error information from the secondary back to the primary while maintaining the required primary-secondary isolation, the error information being proportional to the pulse width in the pulse train transferred through the coupling transformer.

PATENTED AUG 31 1971      3,602,801

INVENTOR.
JAMES A. WILLIAMSON
BY
H. H. Losche
ATTORNEY

SWITCHING VOLTAGE AND CURRENT REGULATOR CONTROLLER

BACKGROUND OF THE INVENTION

This invention relates to voltage and current regulators and more particularly to a voltage and current regulator controlled by the sensing of the pulse width of each pulse in a pulse train supplied to a load through an isolation transformer proportional to error voltage on the secondary output to the load in conjunction with the control of solid state switching circuit in an additional secondary winding circuit to regulate a power solid state control means in the primary circuit.

While many voltage and current regulator devices are well known in the art using magnetic amplifiers or other tube and solid state devices, there are no known devices which have primary-secondary isolation without the aid of magnetic amplifiers.

SUMMARY OF THE INVENTION

In the present invention a supply voltage is conducted to a load through an isolation transformer and the load side is sensed for load demand and fed back to the supply or primary side to correct the primary output to satisfy the load demand. The load demand sensing device senses the error between load supply and load demand in pulse width and this pulse width error signal is operative through an isolation amplifier to produce an increase or decrease in the load supply or primary to satisfy the load conditions. A third winding is incorporated in the isolation transformer to control a solid state driver and power elements to store more or less energy in the primary circuit in direct correspondence to the load demands. It is therefore a general object of this invention to provide a pulse coupling feedback circuit across an isolation transformer from a voltage source to a voltage load to sense pulse width on the load or secondary side proportional to load demand, the isolation transformer having a third winding circuit with solid state switches controlled thereby in the primary circuit and controlled by the feedback signals to regulate the primary circuit output in accordance with load voltage and current demands.

BRIEF DESCRIPTION OF THE DRAWING

These and other objects and the attendant advantages, features, and uses will become more apparent as a more detailed description proceeds when considered along with the accompanying drawing in which.

DESCRIPTION OF THE PREFERRED EMBODIMENT

Figure 1:
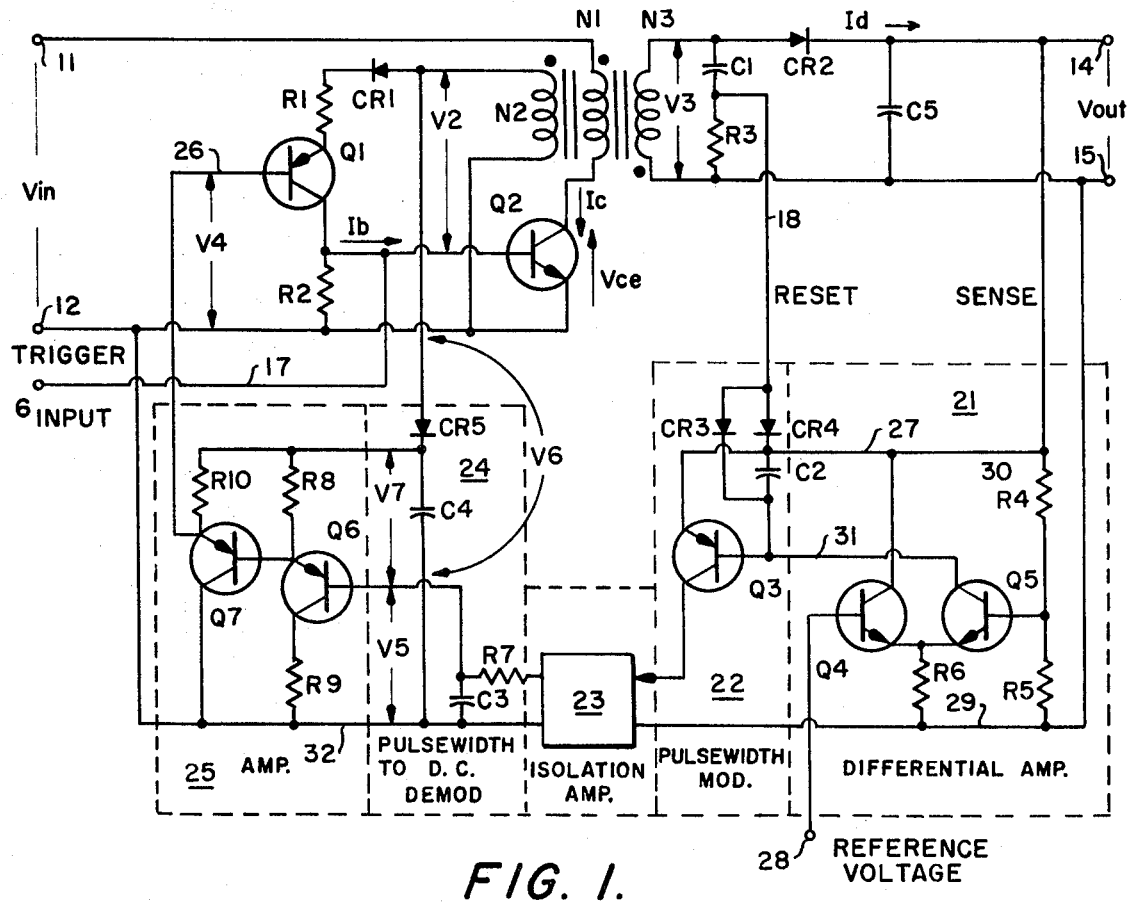
FIG. 1 is a circuit schematic partially in block of the switching voltage and current regulator of this invention.

Referring more particularly to FIG. 1 the voltage input to the circuit is designated as $V_{in}$ applied to terminals 11 and 12 and the output $V_{out}$ is taken from terminals 14 and 15. The voltage from the input to the output is coupled through a transformer having a primary and two secondaries identified by the windings N1, N2, and N3. The primary winding N1 is coupled to the terminal 11 through one lead, the opposite lead being to the collector of an NPN transistor Q2, and the emitter being coupled to terminal 12. The secondary N2 has one lead coupled to terminal 12 and its opposite lead coupled through a diode CR1 and an emitter load resistor R1 to the emitter of a PNP transistor Q1. The collector of transistor Q1 is coupled to the base of transistor Q2 and also through a load resistor R2 to the common lead connected to the input terminal 12. A trigger input terminal 16 is also coupled by conductor 17 to the base of transistor Q2. The output secondary N3 of the transformer has one lead coupled through a diode CR2 to the output terminal 14 while the other lead of the secondary N3 is coupled directly to the output terminal 15. The output secondary N3 has a differentiating network consisting of a capacitor C1 and a resistor R3 coupled in parallel thereto with the junction of the network coupled by a conductor 18 in common to the anodes of a pair of diodes CR3 and CR4, the cathodes thereof being coupled respectively across the plates of a storage capacitor C2. The output leads 14 and 15 have a filtering capacitor C5 coupled thereacross for filtering the output voltage.

A feedback circuit consisting of a differential amplifier 21, a pulse width modulator 22, an isolation amplifier 23, a pulse width to DC demodulator 24, and a transistor amplifier 25 is coupled from the output lead 14 back to the base of transistor Q1 through the conductor means 26. The pulse width modulator 22 includes a PNP transistor Q3 in combination with the diodes CR3, CR4 and storage capacitor C2 to provide pulse width modulation. The output conductor 14 is coupled through a branch lead 27 to the junction of diode CR4 and capacitor C2 which also provides the emitter voltage to the emitter of transistor Q3. The junction of diode CR3 and capacitor C2 is coupled to the base of transistor Q3 and the collector output of this transistor is coupled directly to the isolation amplifier 23.

The differential amplifier 21 consists of a pair of NPN transistors Q4 and Q5, the base of Q4 being coupled to a reference voltage input terminal 28, the collector coupled to the terminal 14 through the branch circuit 27, and the emitter coupled in common with the emitter of transistor Q5 through an emitter load resistor R6 to the common lead 29 coupled directly to the output terminal 15. The base of transistor Q5 is coupled to the juncture of a voltage divider provided by the resistors R4 and R5 coupled in series between the output terminal 14 and the common output lead 29. The collector of transistor Q5 is coupled by the conductor 31 to the base of transistor Q3.

The output of the isolation amplifier 23 is coupled through a resistor R7 in the pulse width to DC demodulator circuit 24 to the base of an NPN transistor Q6 in the transistor amplifier 25. The junction of the resistor R7 and base of transistor Q6 is coupled to one plate of a capacitor C3, the opposite plate being coupled to the common lead 32 coupled directly to the input terminal 12. A diode CR5 and a capacitor C4 are coupled in series between the upper secondary lead of N2 and the common lead 32, the junction point of CR5 and C4 providing the collector and emitter supply voltages through load resistors R8 and R10, respectively, of the transistors Q6 and Q7 (PNP) in the amplifier 25. The emitter of transistor Q6 is coupled through the emitter load resistor R9 to the common lead 32 while the collector of transistor Q7 is directly coupled to the common lead 32. The emitter of transistor Q7 is the output lead 26 of the amplifier 25 coupled to the base of transistor Q1 completing the circuit through the feedback circuit.

OPERATION

Figure 3:
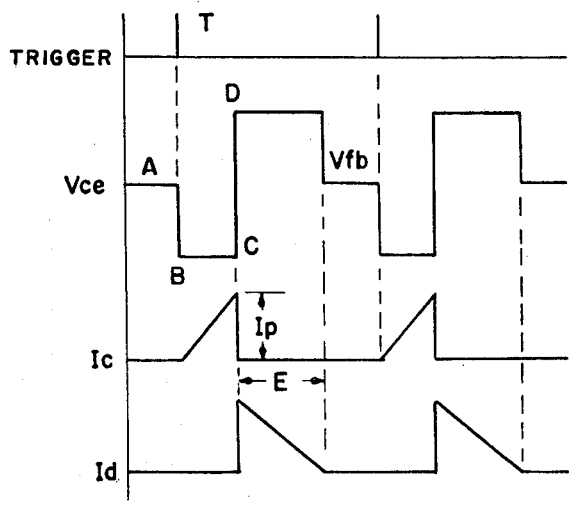
FIG. 3 is a graph of the waveforms at the various circuit points of FIG. 1.
Figure 2:
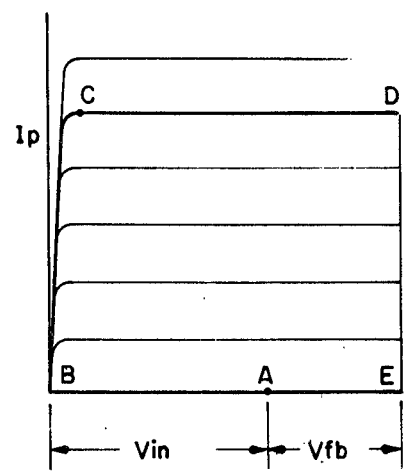
FIG. 2 is a current and voltage graph of the primary circuit in FIG. 1.

In the operation of the device an input voltage $V_{in}$ is applied to the terminals 11 and 12 which impresses a voltage across the emitter and collector of the power transistor Q2 through the primary N1. This is the voltage $V_{ce}$ across the power transistor Q2 at a voltage level shown as A in FIG. 3 on the voltage line $V_{ce}$. The cycle of the circuit is started with the trigger pulse as shown by T in the top line of FIG. 3 applied to terminal 16 and conducted over the lead 17 to the base of transistor Q2 placing this transistor in a saturation conduction state. The full input voltage $V_{in}$, less the small saturation voltage of Q2, is now applied across the primary winding N1 and the current $I_c$ starts to rise with the trigger pulse at the same instant that the voltage $V_{ce}$ across emitter-collector drops to the point B shown in FIG. 3. The collector of Q2 sees only the inductance of N1 and the collector current of Q2 increases linearly sees only the inductance of N1 and the collector current of Q2 increases linearly at a rate established by the input voltage and the inductance of the primary winding N1 to a peak supported by $V_{in}$ and indicated as $I_p$. By the polarity of the windings N1 and N3 there is no secondary current in the secondary N3 because the diode CR2 is reversed biased. The polarity of N1 and N2, as represented by the dots, provides a current flow through N2, through the diode CR1 and the load resistor R1, and through the transistor Q1 back to the base of transistor Q2 represented as the current $I_b$. This develops the voltage V2 across the base driving winding N2 in the relation (N2/N1) $V_{in}$. The values of V4, V2, and R1 establish the amount of collector current in the base drive transistor Q1. The collector load resistor R2 being sufficiently large it can be assumed that all the collector current of Q1 is base current $I_b$ for the power transistor Q2. This base current then requires that Q2 operate on the $I_b$ parameter line of the collector characteristics shown in FIG. 2. Consequently, the operating point of the power transistor Q2 moves from the point B to point C in FIGS. 2 and 3 at a constant rate. At point C when the collector current of Q2 reaches $I_p$, Q2 starts out of saturation as no more collector current can be supported by the fixed base current $I_b$. Thus, the voltage across N1 begins to collapse causing the voltage across N2 to decrease proportionally. The decrease in V2 causes a decrease in the base current for Q2 which in turn attempts to decrease the current in the primary inductance of the transformer causing the collector voltage to further increase. This circumstance results in regeneration until the voltage V3 across the secondary N3 is large enough to forward bias CR2 and allow current to flow in the secondary output to the output terminals 14 and 15 identified as the voltage $V_{out}$. At this time the power transistor Q2 is at a point D where the collector voltage is equal to the input voltage $V_{in}$ plus the flyback voltage $V_{fb}$ with the flyback voltage being determined by (N1/N3) V3. With the secondary current of N3 maintaining the flux in the transformer core the primary N1 current goes to zero; i.e., the operating point of Q2 switches from point D to point E as shown in FIGS. 2 and 3. It may be realized that the voltage in the secondary N3 reverses from negative to a positive state at point D in FIG. 3 and this secondary voltage V3 will be clamped at one diode drop above the output voltage $V_{out}$ while the secondary current decreases at a constant rate until all of the energy stored in the core is delivered to the output. At this time the V3 and $I_d$ go to zero and the power transistor Q2 will then have returned to point A as shown in FIGS. 2 and 3. The system aside from the feedback circuit has now gone through a full cycle and is ready for the next trigger pulse T. For a constant input voltage the variable parameter that adjusts for varying current demands on the output $V_{out}$ is the voltage V4, the control voltage out of the feedback loop applied to the base of the driver transistor Q1. As the voltage V4 decreases the base current of driver transistor Q2 increases thereby allowing the collector current to build to a higher value before regenerative turnoff occurs.

When the power transistor Q2 turns off providing the flyback of the transformer, the voltage V3 switches from a negative to a positive voltage as hereinbefore stated. The positive going signal is differentiated by C1,R3 and used to discharge the storage capacitor C2 through the diode CR3. The diode CR4 clamps the voltage so that the storage capacitor C2 is not pulled above the output voltage $V_{out}$. The voltage $V_{out}$ is sensed from the terminal 14 through the voltage divider R4,R5 on the base of the transistor Q5 in the differential amplifier 21 which voltage is compared with the reference voltage applied to the terminal 28 and impressed on the base of transistor Q4. The charging rate of the storage capacitor C2 is established by the collector current of Q5 in the differential amplifier which is proportional to the error in the output voltage $V_{out}$. The transistor Q3 in the pulse width modulator 22 will remain back biased until the voltage across the storage capacitor C2 reaches a voltage established by the base emitter voltage of this transistor. At this point transistor Q3 will turn "on" and inject current into the input of the isolation amplifier 23 causing the output to change state. Transistor Q3 will then remain "on" until flyback occurs and capacitor C2 is again reset. The output of the isolation amplifier 22 is an inversion of the input; that is, when there is current into the input, the output is low and with no current into the input the output is high. The portions of the feedback loop on the primary side of the regulator circuit consists of a pulse width to DC converter or demodulator 24 and an amplifier 25, the output of the latter being the control voltage on the base of transistor Q1. The capacitor-resistor combination R7,C3 is a low pass filter that produces a DC voltage identified in FIG. 1 as V5 at the base of transistor Q6 in the amplifier 25. This DC voltage is proportional to the pulse width out of the isolation amplifier 23. The voltage V5 establishes the voltage at the emitter of transistor Q6 which in turn determines the current through Q6 and thus the voltage drop, V7, across the collector-resistor R8. The transistor Q7 provides a low source impedance for the control voltage V4 so there is little loading by transistor Q1.

For load regulation it may be seen that an increase in the output current $I_o$ demand causes a decrease in the output voltage or $V_{out}$ which in turn decreases the voltage sensed by the differential amplifier 21. The collector current in Q5 is then reduced thereby decreasing the charge rate of the storage capacitor C2. Since the storage capacitor C2 charges slower, Q3 is "off" for a longer time and the output of the isolation amplifier 23 is high for a longer portion of the cycle, therefore the DC voltage V5 increases the voltage V4 decreases. Reduction in the voltage V4 drives more base current into the power transistor Q2 and allows the collector current to rise to higher value before regenerative turnoff occurs. The increase in the peak collector current in Q2 allows it to be "on" for a longer time thereby storing more energy in the primary N1 and also thereby delivering more energy in the secondary N3 to accommodate an increased load current demand.

For line voltage regulation the base current for the power transistor Q2 is controlled by the difference in the voltage V2 across the base drive secondary winding N2 and the voltage V4 at the base of transistor Q1. The voltage V4 is established by voltage V6 across the diodes CR5 and capacitor C4 providing the supply voltage for transistors Q6 and Q7 in the amplifier 25. The voltage V4 is also established by the voltage drop across the collector resistor R8, this voltage being determined by the equation V4 =V6 −V7 −$V_{be}$(Q7). Considering the collector of transistor Q6 to be a constant current source, V7 is constant and independent of the voltage across V6. V6 on the other hand is equal to the amplitude to which V2 goes positive since CR5 and C4 peak detect the positive swings of V2 developed in the secondary winding N2. Since V2 is positive when the input or line voltage is impressed across N1, changes in the input voltage will reflect as proportional to changes in V2 which are in turn reflected as equal changes in V6. With V7 remaining constant, difference in V2 and V4 is unchanged and the current into the base of the power transistor Q2 is independent of the input voltage variations, the peak current in the primary N1 remains uneffected, and the output power remains the same. Thus the circuit exhibits an inherent common mode rejection to ripple, drift, low frequency noise, and voltage level changes on the input line voltage.

While many modifications and changes may be made to provide equivalent structures to that shown in the preferred embodiment herein it is to be understood that I desire to be limited in the spirit of my invention only by the scope of the appended claims.

1. A switching voltage and current regulator controller comprising:
    an isolation transformer having a primary circuit and two secondary circuits, said primary circuit being coupled to a source of electrical energy and one of said secondaries being coupled to an electrical load;
    a solid state power switch in said primary circuit having a control electrode;
    a solid state driver switch in the other secondary circuit having an output coupled to said control electrode of the power switch and having a control electrode;

a feedback circuit having a sensing means coupled to said one of said secondary circuits and an output coupled to said control electrode of said driver switch through an isolation amplifier, said sensing means sensing the pulse width of voltage signals in said one secondary proportional to the voltage error above and below a predetermined value and converting same to a voltage proportional to the load voltage error, and said feedback circuit having a nonfeedback condition when said secondary circuits fly back and collapse to zero voltage; and means to reset said feedback circuit at intervals to said nonfeedback condition to sense rapid changes in load demands whereby the voltage and current demands are met by the supply voltage.

2. A switching voltage and current regulator controller as set forth in claim 1 wherein said solid state power switch and solid state driver switch are transistors and said control electrodes thereof are the base electrodes.

3. A switching voltage and current regulator controller as set forth in claim 2 wherein said feedback circuit sensing means is a differential amplifier which senses the amplitude difference of voltage signals on said one secondary with respect to a reference voltage for a time period corresponding to pulse width stored in a capacitor storage element, said stored amount of voltage being operative through said isolation amplifier to be applied to said control electrode of said driver transistor.

4. A switching voltage and current regulator controller as set forth in claim 3 wherein said means to reset said feedback circuit consists of a pair of diodes having the anodes thereof coupled in common to said one secondary and the cathodes coupled respectively to opposite plates of said capacitor storage element.

5. A switching voltage and current regulator controller as set forth in claim 1 wherein said feedback circuit is through a differential amplifier, a pulse width modulator, said isolation amplifier, a pulse width demodulator, and a transistor amplifier, in that order from said one secondary to said control electrode of said driver switch.

6. A switching voltage and current regulator controller as set forth in claim 5 wherein said pulse width modulator includes a pair of diodes, a storage capacitor, and a transistor, said pair of diodes having their anodes coupled in common to said one secondary and their cathodes coupled respectively across said storage capacitor, and the base electrode of said transistor being coupled to the output of said differential amplifier and one plate of said storage capacitor with the emitter and collector terminals thereof coupled between said one secondary and said isolation amplifier.

7. A switching voltage and current regulator controller as set forth in claim 6 wherein said pulse width demodulator includes a low pass filter coupled between said isolation amplifier and said transistor amplifier and a diode and capacitor in series between said other secondary and a fixed potential providing peak detection of the voltage in said other secondary, said peak detected voltage applied from the juncture of said diode and capacitor as supply voltage to said transistor amplifier.